United States Patent [19]

Michel-Kim

[11] Patent Number: 4,541,845
[45] Date of Patent: Sep. 17, 1985

[54] PROCESS AND APPARATUS FOR SEPARATING SOLID AND/OR LIQUID PARTICLES FROM GASES OR LIQUIDS

[76] Inventor: Herwig Michel-Kim, Bamberger Strasse 41, D-1000 Berlin 30, Fed. Rep. of Germany

[21] Appl. No.: 662,527

[22] Filed: Oct. 18, 1984

Related U.S. Application Data

[63] Continuation of Ser. No. 462,605, Jan. 31, 1983, abandoned.

[30] Foreign Application Priority Data

Feb. 1, 1982 [DE] Fed. Rep. of Germany ....... 3203842

[51] Int. Cl.⁴ ..................... B01D 57/00; B01D 59/18
[52] U.S. Cl. ........................................ 55/17; 55/277; 55/441
[58] Field of Search ............... 55/17, 66, 71, 277, 55/434, 441

[56] References Cited

U.S. PATENT DOCUMENTS

| | | | |
|---|---|---|---|
| 2,951,554 | 9/1960 | Becker | 55/17 |
| 3,077,714 | 2/1963 | McIlvaine | 55/434 X |
| 3,320,722 | 5/1967 | Lucas | 55/17 |
| 3,362,131 | 1/1968 | Becker | 55/17 |
| 3,509,932 | 5/1970 | Chambers | 55/17 X |
| 3,708,964 | 1/1973 | Becker et al. | 55/17 X |
| 3,813,856 | 6/1974 | Jensen | 55/17 X |
| 3,853,528 | 12/1974 | Wodrich et al. | 55/17 X |
| 3,877,892 | 4/1975 | Bley et al. | 55/17 |
| 3,989,483 | 11/1976 | Becker et al. | 55/17 |
| 4,141,699 | 2/1979 | Anderson | 55/17 |
| 4,235,606 | 11/1980 | Becker et al. | 55/17 |
| 4,246,007 | 1/1981 | Becker et al. | 55/17 |
| 4,255,404 | 3/1981 | Chen | 55/17 X |
| 4,276,068 | 6/1981 | Laussermair et al. | 55/17 X |
| 4,297,191 | 10/1981 | Chen | 55/17 X |
| 4,344,780 | 8/1982 | Groszstuck | 55/17 X |

Primary Examiner—Robert Spitzer
Attorney, Agent, or Firm—Basile, Weintraub & Hanlon

[57] ABSTRACT

A process for the separation of solid and/or liquid particles from gases or solids from liquids, as well as for the separation of gases or liquids with different densities is proposed, in which a Venturi tube is used. The gas and/or liquid mixture is introduced inwards in radially symmetrical manner from the outside through the slot of an annular nozzle at a high flow velocity which, in the case of gases, extends up to the velocity of sound. The gas is subject to the action of a high centrifugal acceleration in the slot, which has a radius of curvature of approximately 1 to 100 mm.

19 Claims, 4 Drawing Figures

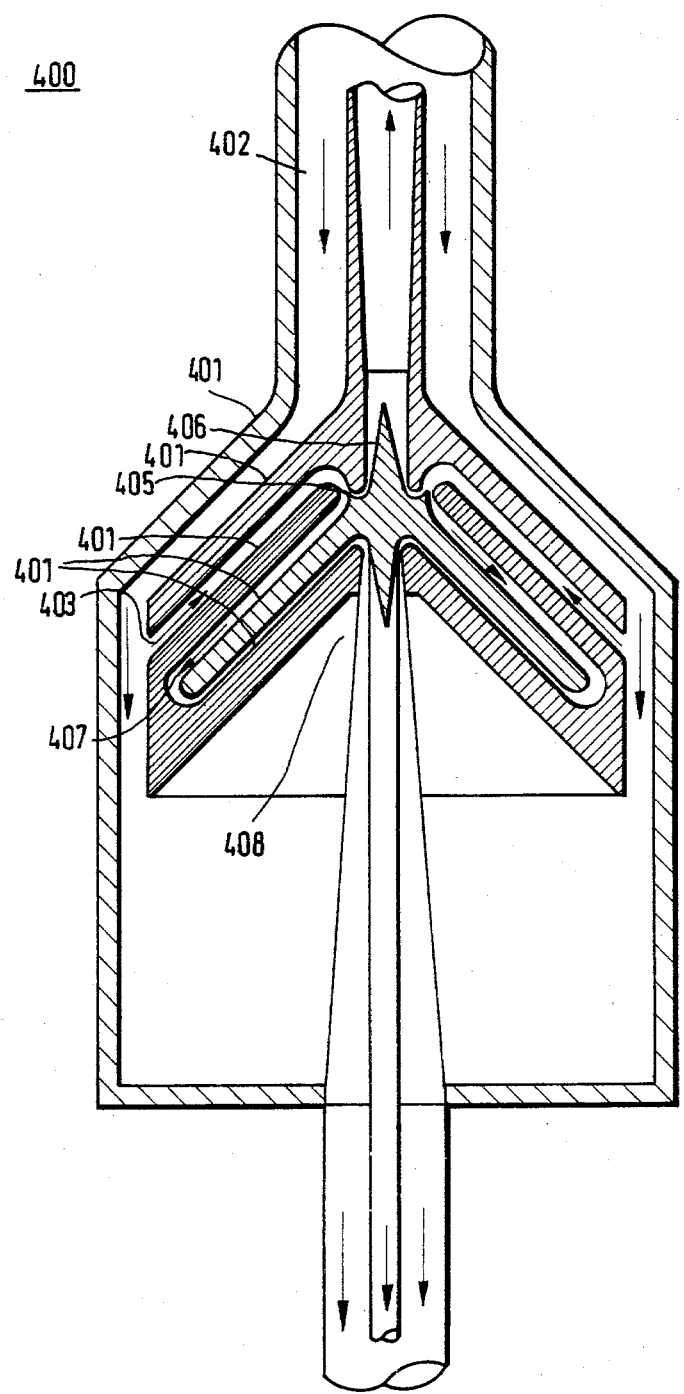

PROCESS AND APPARATUS FOR SEPARATING SOLID AND/OR LIQUID PARTICLES FROM GASES OR LIQUIDS

This application is a continuation of application Ser. No. 462,605, filed Jan. 31, 1983, now abandoned.

BACKGROUND OF THE INVENTION

I. Field of the Invention

The invention relates to a process for the separation of solid and/or liquid particles from gases or solids from liquids, as well as for the separation of gases or liquids having different densities.

II. Description of the Prior Art

It is known to separate gas and liquid mixtures in cyclones and centrifuges using centrifugal acceleration. In addition, the separation nozzle process in a curved slot is known for the purpose of isotopic separation, particularly in uranium enrichment. However, this process has the disadvantage that there is a transverse flow through the two gap ends used in this process, which leads to faults and requires comparatively large quantities of energy.

SUMMARY OF THE INVENTION

The present invention is therefore to provide a process and apparatus for the separation of solid and/or liquid particles from gases or solids from liquids, as well as the separation of gases or liquids having different densities, a good separation of the different fractions being ensured through the use of simple means.

The process and apparatus according to the invention have the advantage that through the radially symmetrical arrangement of the annular nozzle there are no slot ends which can cause faults. As a result of the curvature in the inlet of the Venturi nozzle or tube used according to the invention, only limited detachment phenomena occur, so that separation is improved and energy losses reduced.

A very high proportion of the compression energy can be recovered in the flow-optimized diffusers, so that the total energy consumption for separation purposes is reduced. The possibilities of injecting liquids are favorable to the separation and abrasion or wear to the nozzle is considerably reduced. In addition, the liquid has a cooling function.

The process and apparatus according to the invention offer the advantage that they can be used in a large number of different separation processes. Thus, it is possible to separate fine dust from hot gases, which is necessary for gas treatment in gas turbines, because these require a high purity level of gases. This obviates energy losses through the cooling and purification of the gases. The process according to the invention can be used in isotopic separation, particularly in uranium enrichment, replacing the high energy consuming separation nozzle process. As the process according to the invention can also be used for separating water from pyrolysis gases, it is possible to solve a key problem in pyrolysis, namely the elimination of foul water. It is also possible to separate sulphur dioxide from flue gases, selectively wash gaseous constituents in gaseous mixtures, separate oils from water and sediments from sewage and carry out compact gas cooling by the injection of liquids without liquid droplets being entrained.

Other objects, advantages and applications of the present invention will become apparent to those skilled in the art of separating solid and liquid particles when the accompanying description is read in conjunction with the attached drawings.

BRIEF DESCRIPTION OF THE DRAWINGS

The process and apparatus according to the invention are described hereinafter relative to non-limitative embodiments and the attached drawings, wherein:

FIG. 4 is an example of the invention with a recuperator.

DESCRIPTION OF THE PREFERRED EMBODIMENTS

Figure 1:
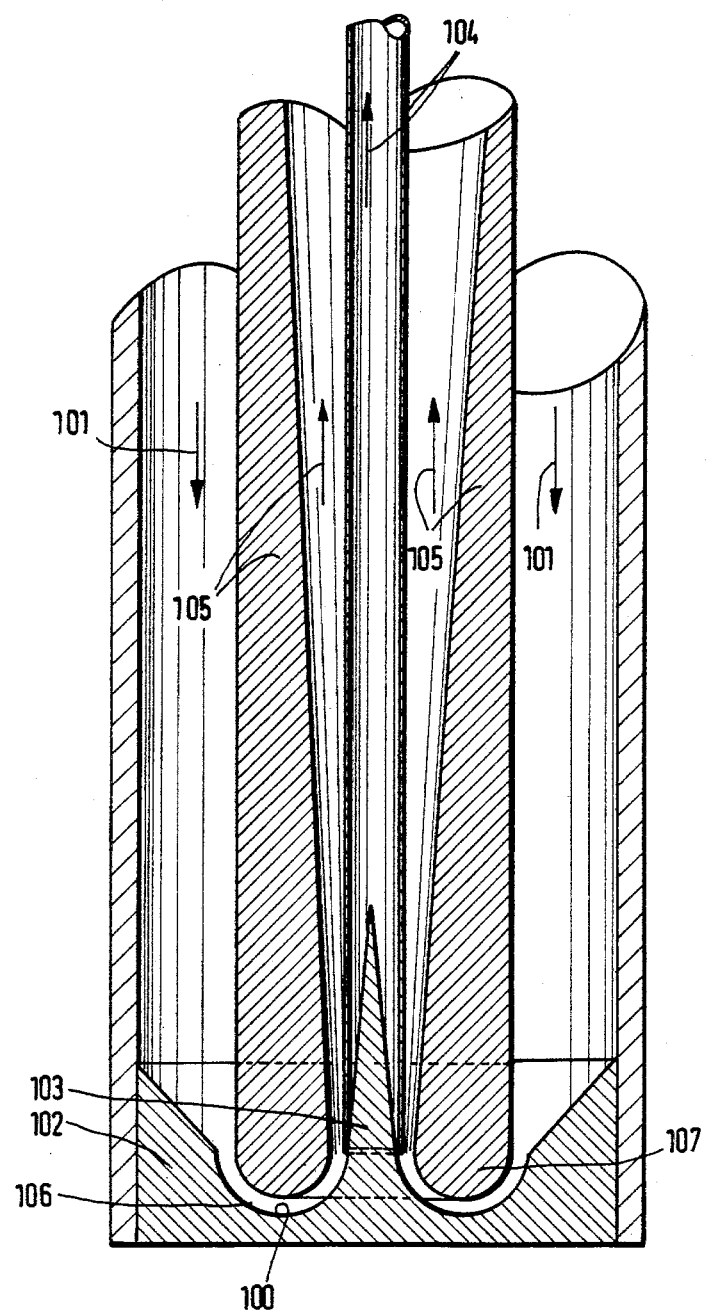
FIG. 1 is a first embodiment of the present invention in which diffusers are arranged within one another in the same flow direction.

In the sectionally represented embodiment of FIG. 1, 101 is an axially symmetrical nozzle supply inlet, which passes into an annular nozzle 100. A diffuser 104 for the heavy fraction and a diffuser 105 for the light fraction are axially symmetrically arranged around the central axis, diffuser 105 for the light fraction being arranged around diffuser 104 for the heavy fraction. The slot of nozzle 100 is formed by nozzle base 102 and by diffuser 105 which widens towards the lower end. Nozzle base 102 has an annular turn or deflection 106, which passes into a cone apex 103. The lower end of diffuser 105 is terminated by a rounded portion 107 and forms the inner curvature limitation of the nozzle gap, while the annular deflection 106 of nozzle base 102 forms the outer curvature limitation. Cone apex 103 projects into diffuser 104 for the heavy fraction. The flow cross-section of nozzle 100 is reduced continuously from the inside to the outside.

The apparatus shown in FIG. 1 operates in the following way. The dust or aerosol-laden gas, the gaseous mixture of the liquid mixtures pass via nozzle supply inlet 101 into annular nozzle 100, where they are deflected by 180° at high speeds. The flow through the nozzle takes place from the outside to the inside, because this leads to a maximum radial acceleration in the essential flow regions. The nozzle has its minimum flow cross-section in the range of the greatest radial acceleration. As a result of the high speed, a separation takes place of the different fractions. In the region of the greatest separation of the mixtures, there is a skimming of the varyingly dense fractions at the lower end of diffuser 104, and the light fraction is passed on by diffuser 105 and the heavy fraction by diffuser 104. The diffusers are shaped in such a way that the flow resistance can be kept low. The cone apex 103 projecting into diffuser 104 permits a low detachment diffusion of the heavy fraction. The fractions are expanded in diffusers 104, 105, so that most of the previously used compression energy is recovered.

Figure 2:
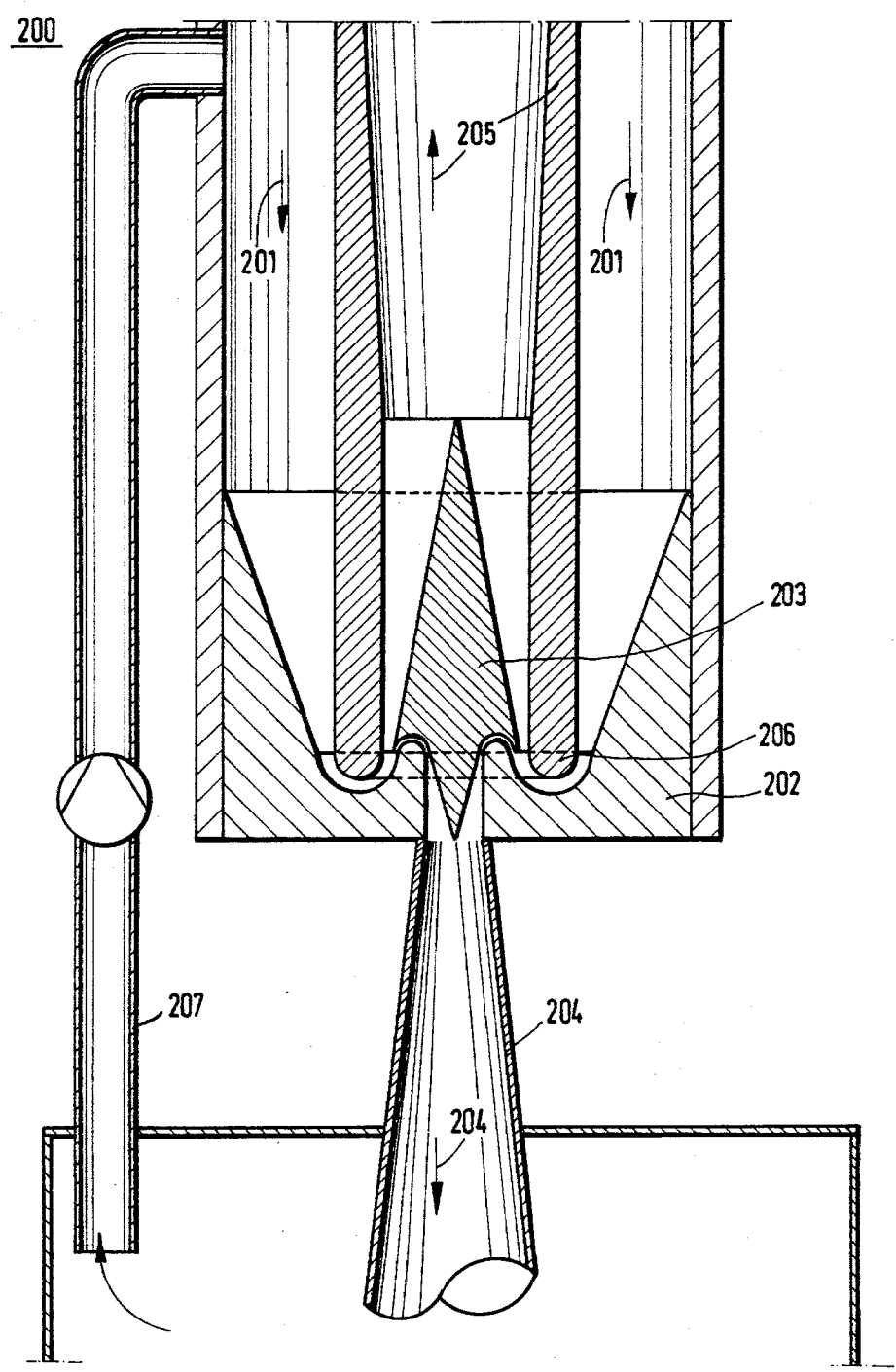
FIG. 2 is a second embodiment of the invention in which the diffusers are arranged in opposite directions.

FIG. 2 is a sectional representation of a further embodiment, in which identical and identically acting parts carry the same reference numerals as in FIG. 1. The difference compared with the embodiment of FIG. 1 is that the diffusers 204 and 205 are not arranged within one another in the same flow direction and are instead directed in opposite directions. Diffuser 204 for the heavy fraction is in this case located towards the bottom. An annular deflection part 203, which replaces cone apex 103, is used for guiding the heavy fraction constituents.

The gas (or liquid) may have flow velocities which can extend up to the velocity of sound. The slot may have a radius of curvature of approximately 1 to 100 mm.

The skimming of the varyingly dense fractions now takes place at deflection part 203. Heavy fraction constituents can be returned to the nozzle by means of bypass system 207. Operation is as described hereinbefore.

In order to improve the separation of the different fractions, it is possible to apply an electric field between nozzle base 202 and diffuser 205 which, with its round portion, simultaneously serves as an inner curvature limitation for the slot.

In the case of gaseous mixtures, liquids can additionally be injected into the nozzle supply inlet 201, which improves the separation of solids from the gases. In addition, the liquids are used for washing, cooling and reducing wear to the nozzle, so that the service life thereof is considerably increased. The liquids can then be separated with the heavy fraction according to FIG. 2.

Figure 3:
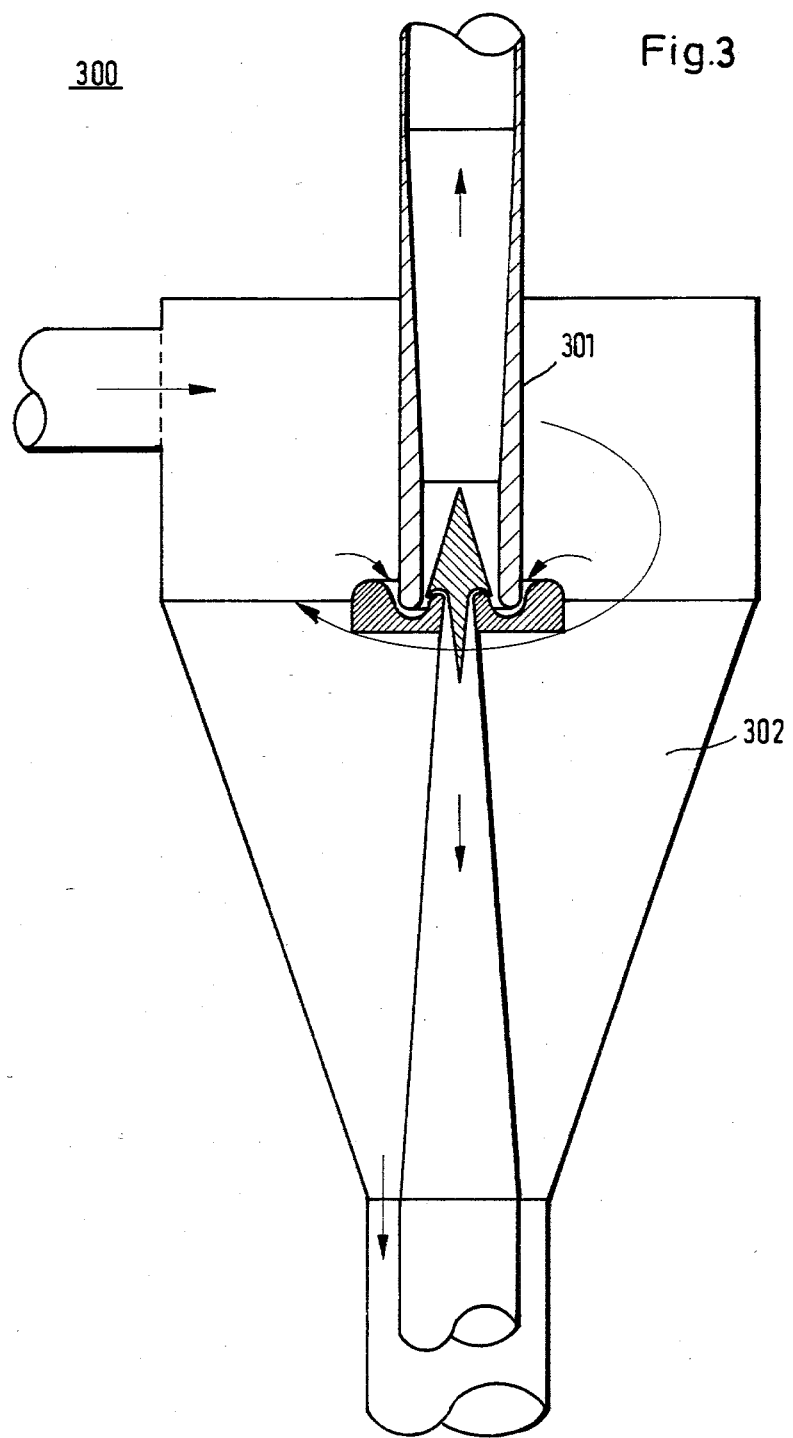
FIG. 3 is an example of the invention incorporated into a cyclone.

FIG. 3 shows the use of the apparatus 300 according to the invention in a cyclone 302. This arrangement represents a particularly advantageous combination, because it is possible to separate the coarse constituents in the cyclone 302 and the fine constituents in the annular nozzle 301. This takes place in accordance with the operation described hereinbefore. This arrangement provides the further advantage that existing cyclones can be reequipped through the installation of the apparatus according to the invention.

Apparatus 400 in FIG. 4 shows the combination of the annular nozzle according to the invention with a conical recuperator 401. In this embodiment the hot flue gases enter supply inlet 402 and flow outwards in radially symmetrical manner along the conical walls of the recuperator. Larger constituents can be separated by a deflection means 403. The prepurified gases then again flow radially symmetrically inwards along a conical surface, the flow velocity being increased by the constriction of the cross-section and internally there is a deflection by 180°. A further dust fraction is separated by a skimming device 405 and is supplied via a diffuser 406 to a separate separator system and is then returned by means of a bypass. Following this first skimming operation, the gas is led outwards to a conical heat exchanger 407 and is then returned inwards again in order to undergo complete purification in the annular nozzle 408 as in accordance with FIG. 1.

There is no need for heat exchanger 407 to have a conical construction. It is also possible to use a plane-parallel flat exchanger around which once again there is a radial inwards to outwards and outwards to inwards flow, skimming being aided by the internal deflection with high radial accelerations. However, with hot gases, it is very likely that the constructionally simpler flat arrangement will warp. With the conical arrangement, thermal stresses only lead to a change in the cone angle, which can be constructionally very easily absorbed.

I claim:

1. A process for the separation of solid and/or liquid particles from gases or solids from liquids, as well as for the separation of gases or liquids of different densities, using a Venturi tube, characterized in that the gas and-/or liquid is supplied axially into said venturi tube and flows radially symmetrically from the outside to the inside through a slot in an annular nozzle at flow velocities which can extend up to sound velocity, and in the slot with a radius of curvature of approximately 1 to 100 mm is subject to high centrifugal acceleration.

2. The process defined in claim 1, characterized in that in the case of gaseous mixtures, prior to separation liquids are injected, which are separated, with the heavy fractions.

3. An apparatus for performing the process for the separation of solid and/or liquid particles from gases or solids from liquids, as well as for the separation of gases or liquids of different densities, using a Venturi tube comprising:

an inlet for fluid flow;

an annular nozzle disposed at the end of the inlet;

a bottom wall;

the nozzle formed in said bottom wall having a slot with a radius of curvature of approximately 1 to 100 mm through which fluid flows from the outside through the inlet and through the slot at flow velocities which extend up to sound velocity and are subject to the action of a high centrifugal acceleration, the slot being formed with a deflection angle of >90° such that it is arranged about the central axis of the nozzle both at the start and finish of fluid flow deflection and in the direction of the fluid flow, the diameter of the slot decreasing outwardly from the central axis of the nozzle.

4. The apparatus defined in claim 3, characterized in that for reducing detachments of the flowing medium in the curvature of the flow cross-section, there is a continuous size reduction in the curvature region in the flow direction up to the area of separating the fractions.

5. The apparatus defined in claim 4, characterized in that the annular nozzle is constructed in such a way that in the vicinity of the maximum radial acceleration it has the smallest flow cross-section.

6. The apparatus defined in claim 4, characterized in that in the region of the maximum separation of the fractions, an arrangement for the skimming of the varyingly dense fractions is provided.

7. The apparatus defined in claim 3, characterized in that at least two diffusers are provided for passing on the separated fractions.

8. The apparatus defined in claim 7, characterized in that the diffusers are arranged within one another in the same flow direction.

9. The apparatus defined in claim 7, characterized in that a cone projects axially into the inner diffuser for the heavy fraction.

10. The apparatus defined in claim 7, characterized in that the diffusers are arranged in opposite directions, a deflection part being provided for the deflection of the heavy fraction and simultaneously serves as a skimming means.

11. The apparatus defined in claim 7, characterized in that for the recovery of the compression energy, diffusers are constructed in such a way that the separated fractions can be expanded.

12. The apparatus defined in claim 7, characterized in that it is integrated into a recuperator.

13. The apparatus defined in claim 7, characterized in that it is combined with a cyclone.

14. The apparatus defined in claim 7, characterized in that an electrical field is applied between the bounding curvature surfaces to improve the separation of the fractions.

15. An apparatus for performing the separation of solid and/or liquid particles from gases, or solids from liquids, as well as the separation of gases or liquids of different densities into heavier and lighter fractions comprising:
   an inlet for fluid flow;
   a bottom wall;
   a nozzle in said bottom wall disposed at one end of the inlet;
   a first diffuser for the heavier fractions;
   a second diffuser for the light fraction;
   the first and second diffusers communicating with the nozzle and disposed concentrically within the inlet, the first diffuser being disposed about the second diffuser; and
   an arcuate slot formed in the one end of the nozzle to direct fluid from the inlet to the first and second diffusers under high centrifugal acceleration.

16. An apparatus for performing the separation of solid and/or liquid particles from gases, or solids from liquids, as well as the separation of gases or liquids of different densities into heavier and lighter fractions comprising:
   an outer tube having a closed end;
   an intermediate tube spaced from the outer tube, said space between said outer tube and said intermediate tube defining an inlet nozzle;
   an inner tube spaced from and positioned within the bore of said intermediate tube, said space between said inner tube and said intermediate tube bore defining a lighter fractions exit nozzle;
   the bore of said inner tube defining a heavier fractions exit nozzle;
   said closed end including an arcuate formed therein to reverse the flow of said inlet nozzle and deflect the inlet flow into said lighter fractions exit nozzle and said heavier fractions exit nozzle; and
   the bottom end of the wall of said intermediate tube formed in an arcuate manner compatible with and spaced from said arcuate in said bottom end to centrifugally accelerate the flow from said inlet nozzle and separate the heavier and lighter fractions.

17. The apparatus as defined in claim 16 further comprising the bore of said intermediate tube tapered to slow the velocity of the lighter fractions exit nozzle in an energy efficient manner.

18. The apparatus as defined in claim 16 further comprising:
   a centrally positioned upward extending tapered projection formed on said closed end;
   said tapered projection projecting into the bore of said inner tube to slow the velocity of the heavier fractions exit nozzle in an energy efficient manner.

19. An apparatus for performing the separation of gases or liquids of different densities into heavier and lighter fractions comprising:
   a plurality of tubes concentrically nested with radial space between tubes comprising:
   an outer tube having a closed end;
   an intermediate tube spaced from the outer tube, said space between said outer tube and said intermediate tube defining an inlet nozzle;
   an inner tube spaced from and positioned within the bore of said intermediate tube, said space between said inner tube and said intermediate tube defnining a lighter fractions exit nozzle;
   the bore of said inner tube defining a heavier fractions exit nozzle;
   said closed end including an arcuate formed therein to reverse the flow of said inlet nozzle and deflect the inlet flow into said lighter fractions exit nozzle and said heavier fractions exit nozzle;
   said intermediate tube having a wall, the bottom end of said intermediate tube wall formed in an arcuate compatible with and spaced from said arcuate in said bottom end to centrifugally accelerate the flow from said inlet nozzle and separate the heavier and lighter fractions;
   the bore of said intermediate tube tapered to enlarge an upper end thereof and gradually reduce the velocity of the fluid in said lighter fractions exit nozzle in an energy efficient manner;
   a centrally positioned upward extending tapered projection formed on said closed end, said tapered projection extending into the bore of said inner tube to gradually reduce the velocity of the heavier fractions in an energy efficient manner; and
   wherein the gases or liqudis entering the apparatus to have their heavier and ligher fractions separated enter the apparatus in one direction and the separated heaver and lighter fractions exit the apparatus in an opposed direction.

* * * * *